United States Patent [19]

Muldoon

[11] Patent Number: 5,520,030
[45] Date of Patent: May 28, 1996

[54] GOOSENECK TRAILER LOCK

[76] Inventor: John E. Muldoon, Rte. 1, Box 94, East Ninnekah, Okla. 73067

[21] Appl. No.: 416,117

[22] Filed: Apr. 3, 1995

[51] Int. Cl.$^6$ ...................................................... B60D 1/60
[52] U.S. Cl. .................... 70/14; 70/232; 70/237; 70/238; 70/258; 248/352; 248/552; 280/507
[58] Field of Search ........................ 70/14, 57, 58, 70/18, 232, 258, 237, 238, 158, 163, 164, 166, 386; 248/352, 551, 552; 280/507, 511

[56] References Cited

U.S. PATENT DOCUMENTS 4,428,596  1/1984  Bell et al. .................... 280/507
4,459,832  7/1984  Avrea et al. .................... 70/14
4,548,418  10/1985  Wendorff .................... 280/507 X
5,165,265  11/1992  Maionchi .................... 70/232
5,197,311  3/1993  Clark .................... 70/232
5,255,545  10/1993  Wheeler .................... 70/232
5,259,223  11/1993  Nee .................... 70/232

Primary Examiner—Lloyd A. Gall
Attorney, Agent, or Firm—Robert K. Rhea

[57] ABSTRACT

A gooseneck trailer locking apparatus is formed by a pair of elongated telescoping members having a hitch ball and chain lock at one end for connection with the king pin of a gooseneck trailer. The other end of the telescoping members is provided with a clevis element lockably closely surrounding the depending portion of a trailer leveling and supporting jack by a clevis arm and lock securing the clevis to the jack.

5 Claims, 1 Drawing Sheet

U.S. Patent
May 28, 1996
5,520,030
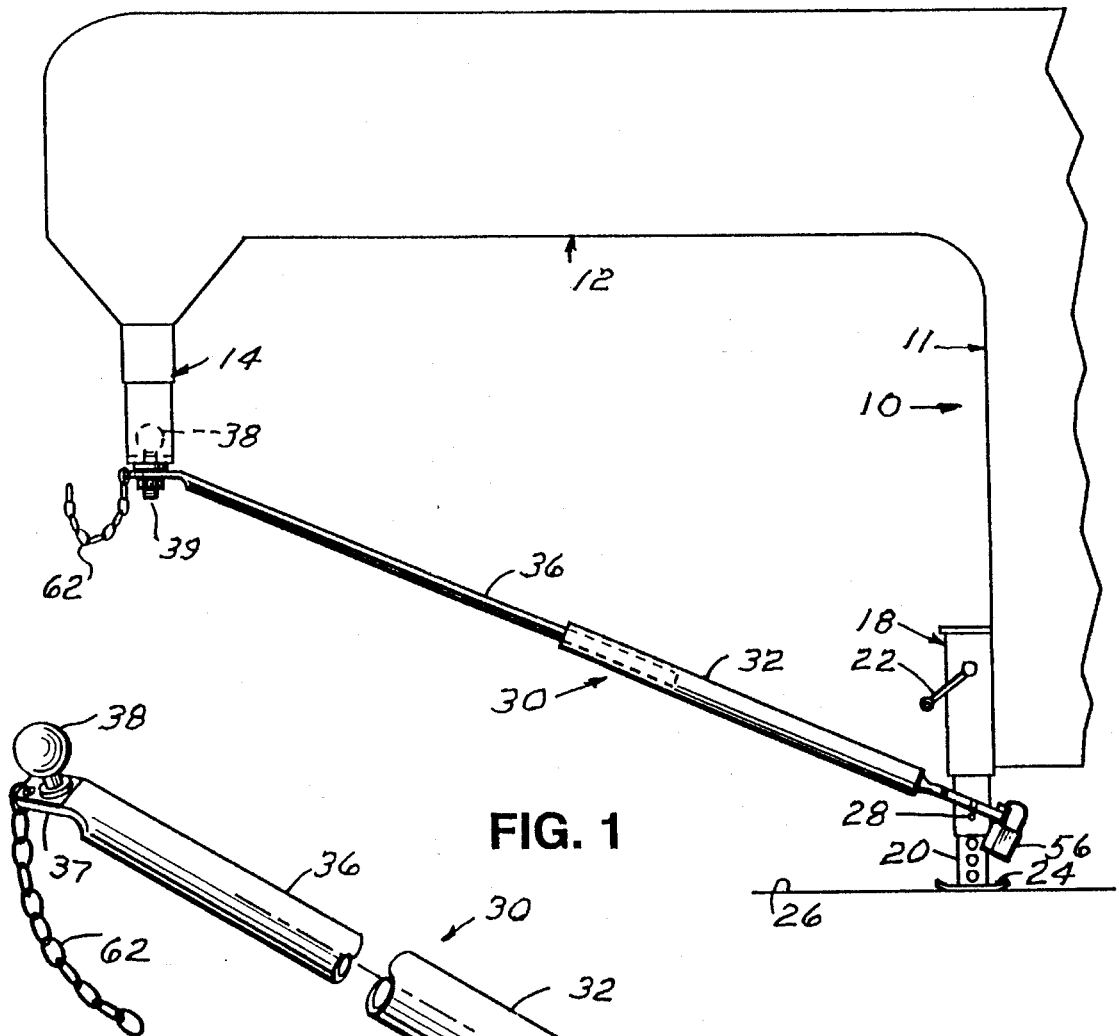
FIG. 1
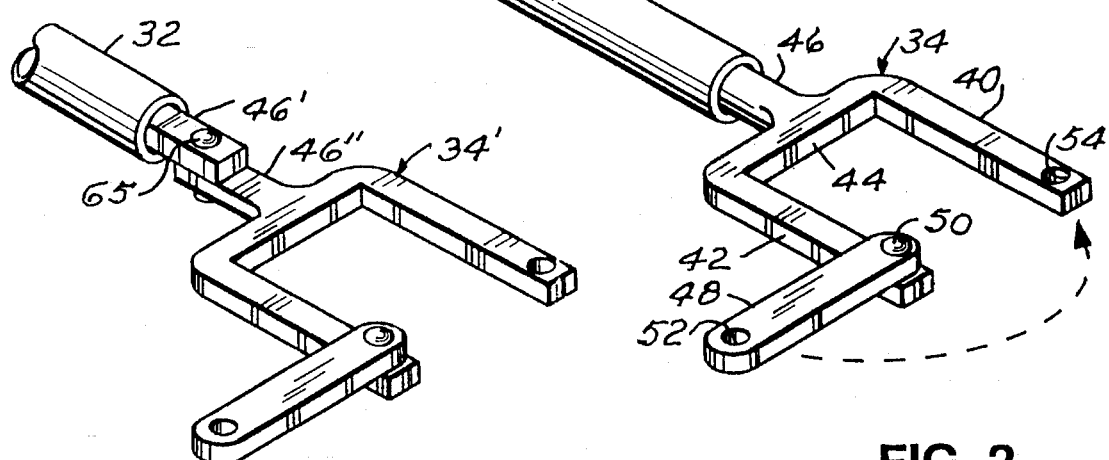
FIG. 3
FIG. 2

GOOSENECK TRAILER LOCK

BACKGROUND OF THE INVENTION

1. Field of the Invention

The present invention relates to gooseneck trailers and more particularly to a lock preventing unauthorized use or theft of the trailer.

Gooseneck trailers are commonly used for industrial purposes as well as recreational vehicles. When the trailer is parked and separated from its towing vehicle, the gooseneck trailer is subject to theft by unauthorized coupling to some other towing vehicle. The gooseneck of a trailer comprises a horizontal beam projecting forwardly from the upper limit of the trailer and terminates at its forward end in a depending cylindrical member such as a post which connects with a fifth wheel apparatus centrally mounted on the bed of a pickup truck as a towing vehicle. The length of the beam and its elevated position provides sufficient space between the forward limit of the trailer and the rearward portion of the towing vehicle for pivoting movement of the towing vehicle relative to the trailer when executing curves. The unattended coupling post of the trailer gooseneck thus provides a temptation to unscruplious persons to attach the towing vehicle to the trailer and appropriate it.

This invention secures a gooseneck trailer against unauthorized use by providing an elongated locking member which is lockably connected with the gooseneck coupling post and a leveling support jack secured to and depending from the forward end of the trailer.

2. Description of the Prior Art

The prior art has been principally directed toward locking devices for gooseneck trailer hitch posts for a combination lock and support for the forward end of the trailer.

U.S. Pat. No. 5,165,265 issued Nov. 24, 1992 to Maionchi for TRAILER SECURITY LOCK APPARATUS and U.S. Pat. No. 5,197,311 issued Mar. 30, 1993 for FIFTH WHEEL JACK STAND LOCK respectively disclose locking apparatus secured to the coupling post of the gooseneck trailer and feature downwardly diverging legs for supporting the forward end portion of such trailer.

U.S. Pat. No. 5,255,545 issued Oct. 26, 1993 to Wheeler for GOOSENECK TRAILER HITCH LOCKING DEVICE and U.S. Pat. No. 5,259,223 issued Nov. 9, 1993 to Nee for KINGPIN SECURITY DEVICE respectively disclose apparatus connected to the coupling post of the gooseneck trailer for preventing access thereto by an unauthorized person and generally represent the further state-of-the-art.

SUMMARY OF THE INVENTION

An elongated member is provided at one end portion with a hitch ball and locking chain for connection with the coupling post of the gooseneck trailer. The other end portion of the elongated member is telescopically received by one end portion of an elongated tubular member having a clevis-like element secured to its other end which cooperatively snugly surrounds the drop leg of a support and leveling jack secured to the forward end of the trailer.

In a second embodiment the clevis is pivotly connected with the telescoping tube for connection with either one of a pair of drop leg jacks secured to either side of the forward end of a trailer.

BRIEF DESCRIPTION OF THE DRAWINGS

FIG. 1 is a fragmentary side elevational view of the forward end of a gooseneck trailer having the device installed thereon;

FIG. 2 is a fragmentary perspective view of the device per se; and,

FIG. 3 is a fragmentary perspective view of a second embodiment of the clevis.

DESCRIPTION OF THE PREFERRED EMBODIMENTS

Like characters of reference designate like parts in those figures of the drawings in which they occur.

The reference numeral 10 indicates the forward end portion of a gooseneck trailer having a beam 12 centrally projecting forwardly a selected distance from the trailer body 11.

At its forward end, the beam is provided with a depending substantially cylindrical post-like portion 14 terminating a selected distance below the beam 12 and provided with a hitch ball receiving socket and latch pin, not shown, as is conventional with gooseneck trailers.

The trailer is further provided with at least one support and leveling jack 18 having a drop leg 20 released and retracted by a crank 22. The depending end portion of the drop leg 20 is provided with a platform 24 for distributing the mass of the forward end of the trailer on the surface of the earth 26. The jack 18 further includes a drop leg pin 28 which is manually inserted transversely through the jack and drop leg apertures when in algined relation. The reference numeral 30 indicates the gooseneck trailer locking device as a whole which is elongated tubular in general configuration. The locking device 30 comprises an elongated tubular member 32 having a yoke means 34 rigidly secured to one end and telescopically receives, at its other end portion one end portion of a second tube 36 having a section of strap iron 37 secured to its other end portion. The strap iron 37 is extended in angular relation with respect to the longitudinal axis of the tube 36 and apertured for receiving the bolt 39 of a hitch ball 38 with the bolt being welded to the strap iron 37 to prevent separation of the hitch ball from the strap iron.

The yoke means comprises a clevis 34 U-shaped in general configuration having parallel legs 40 and 42 connected with a bight portion 44 in turn secured to the tube 32 by a stem 46.

A clevis arm 48 is rigidly secured to the end of the leg 42 opposite the bight portion 44 by a pin 50 for pivoting movement toward and away from the other leg 40. The end of the clevis arm 48 opposite its pivot connection is provided with a vertical aperture 52 which mates with a cooperating aperture 54 formed in the end of the arm 40 opposite the bight portion for receiving the hasp of a lock 56 and securing the clevis to the jack 18 as presently explained.

A length of case hardened chain 62 is secured at one end portion to the strap iron 37. The chain is used to lock the ball 38 to a gooseneck trailer hitch by the latch pin arm, not shown, as by a second lock, not shown.

Operation

In the operation of the embodiments of FIGS. 1 and 2 assuming the trailer is parked and provided with a single jack 18 central depending from its forward end with a drop leg maintained in lowered position by the jack pin 28.

With the clevis arm 48 in opened position, the clevis 34 is positioned on the jack 18 with the clevis legs 40 and 42 disposed above the position of the drop leg pin 28. The clevis arm 48 is pivoted into position for receiving the hasp of the lock 56, thus locking the clevis to the jack.

The hitch ball 38 is inserted into the socket of the gooseneck post 14 and the chain engaged with the latch pin arm and locked with a second lock such as the lock 56.

The device 30 being removed from the trailer by reversing the installation of the hitch ball 38 and the clevis element 34.

Referring also to FIG. 3, a modified form of the yoke means or clevis 34' is illustrated. Some gooseneck trailers, particularly those used as house trailers, are provided with a pair of jacks 18 situated respectively at each forward corner portion of the trailer body 11 in order to support and level the trailer and prevent its tipping as by occupants moving from one side of the trailer to the other.

Since the clevis legs 40 and 42 in cooperation with the bight portion 44, closely engage adjacent sides of the trailer jack depending portion some provision must be made for angularly disposing the longitudinal axis of the telescoping members 32 and 36 with respect to the sides of the jacks and parallel with a longitudinal axis of the trailer 10 and align the clevis legs 40 and 42 with the parallel sides of the corner trailer jacks, not shown.

This is accomplished by dividing the yoke or clevis stem 46 into two portions 46' and 46" with the portion 46' being rigidly connected to the telescoping tube 32 and pivotly connecting the other portion 46" as by a pin 65 permitting lateral pivoting movement of the clevis 34'.

It seems obvious that the operation of the clevis 34' is otherwise identical to that described hereinabove for FIGS. 1 and 2.

Obviously the invention is susceptible to changes or alterations without defeating its practicability. Therefore, I do not wish to be confined to the preferred embodiment shown in the drawings and described herein.

I claim:

1. An antitheft lock for a gooseneck trailer having a trailer hitch ball receiving king pin and at least one trailer support/leveling jack, comprising:

an elongated member for extending between the king pin and said jack;

a trailer hitch ball and chain secured to one end of said member and lockably securable within said king pin;

a clevis having a stem axially secured to the other end of said member and capable of straddling said jack; and, arm and lock means for closing the clevis around said jack.

2. The trailer antitheft lock according to claim 1 in which the elongated member comprise:

a pair of telescoping members.

3. The trailer antitheft lock according to claim 2 in which said clevis is U-shaped having parallel legs normal to a bight portion for closely embracing adjacent sides of said jack.

4. The trailer antitheft lock according to claim 3 in which the arm and lock means comprises:

an arm pivotally connected at one end portion with one end portion of one of said clevis legs; and, a padlock joining the other end portion of said arm with an end portion of the other said parallel leg.

5. The trailer antitheft lock according to claim 4 in which said clevis stem is pivotally connected with an end portion of an adjacent telescoping member.

* * * * *